(12) United States Patent
Gupta et al.

(10) Patent No.: US 11,949,362 B2
(45) Date of Patent: Apr. 2, 2024

(54) POWER TOOL INCLUDING CONDUCTION ANGLE CONTROL

(71) Applicant: MILWAUKEE ELECTRIC TOOL CORPORATION, Brookfield, WI (US)

(72) Inventors: Shuvam Gupta, Wauwatosa, WI (US); Gerry M. Nagel, Sussex, WI (US); Alexander T. Huber, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/727,315

(22) Filed: Apr. 22, 2022

(65) Prior Publication Data
US 2022/0345057 A1    Oct. 27, 2022

Related U.S. Application Data

(60) Provisional application No. 63/179,824, filed on Apr. 26, 2021.

(51) Int. Cl.
*H02P 6/182* (2016.01)
*H02K 7/14* (2006.01)
*H02K 11/33* (2016.01)

(52) U.S. Cl.
CPC ............ *H02P 6/182* (2013.01); *H02K 7/145* (2013.01); *H02K 11/33* (2016.01)

(58) Field of Classification Search
CPC .......... H02P 6/182; H02K 11/33; H02K 7/145
See application file for complete search history.

(56) References Cited

U.S. PATENT DOCUMENTS

| | | | | |
|---|---|---|---|---|
| 3,784,888 | A * | 1/1974 | Geiersbach | H02K 29/06 318/810 |
| 4,933,620 | A * | 6/1990 | MacMinn | H02P 6/06 318/696 |
| 5,168,202 | A * | 12/1992 | Bradshaw | H02K 29/08 318/608 |
| 10,720,870 | B1 * | 7/2020 | Chuang | H02P 25/145 |

(Continued)

FOREIGN PATENT DOCUMENTS

CN    103236813 A  *  8/2013

OTHER PUBLICATIONS

International Search Report and Written Opinion for Application No. PCT/US2022/025964 dated Aug. 11, 2022 (8 pages).

*Primary Examiner* — Lucas E. A. Palmer
(74) *Attorney, Agent, or Firm* — Michael Best & Friedrich LLP (57) ABSTRACT

Systems and methods described herein provide for controlling a conduction angle applied to a motor, such as a power tool motor. Operations for controlling the conduction angle includes receiving by a motor controller, a desired speed signal, and monitoring a speed of the power tool motor. The operation further includes a motor controller determining an error value between the desired speed signal and the monitored speed and determining a conduction angle signal based on the error value. The operation also includes the motor controller determining whether the conduction angle signal is greater than the error value and increasing a conduction angle of the power tool motor in response to the conduction angle signal being determined to be greater than the error value.

17 Claims, 8 Drawing Sheets

(56) References Cited

U.S. PATENT DOCUMENTS

| | | | |
|---|---|---|---|
| 2002/0075076 A1* | 6/2002 | Sowlati | H03F 1/0261 |
| | | | 330/296 |
| 2010/0237809 A1* | 9/2010 | Ogahara | H02P 6/157 |
| | | | 318/400.34 |
| 2011/0148332 A1* | 6/2011 | Kawano | H02P 7/295 |
| | | | 318/244 |
| 2013/0169199 A1* | 7/2013 | Vanko | H02P 3/22 |
| | | | 318/244 |
| 2013/0314007 A1* | 11/2013 | Yanagihara | H02P 6/28 |
| | | | 318/400.13 |
| 2016/0107297 A1* | 4/2016 | Ishikawa | B25B 23/18 |
| | | | 173/179 |
| 2017/0141709 A1* | 5/2017 | Fukuda | H02P 7/06 |
| 2017/0163183 A1* | 6/2017 | Gao | H02P 6/153 |
| 2017/0214353 A1* | 7/2017 | Chuang | H02P 27/04 |
| 2019/0071161 A1* | 3/2019 | Noguchi | B63H 20/00 |
| 2019/0319563 A1* | 10/2019 | Kato | H02P 6/28 |
| 2020/0343840 A1* | 10/2020 | Vanko | B25D 11/064 |
| 2021/0126563 A1* | 4/2021 | Zhu | A47J 43/08 |
| 2022/0024019 A1* | 1/2022 | Sunabe | B25F 5/00 |
| 2022/0200511 A1* | 6/2022 | Friedman | B25B 21/02 |

* cited by examiner

POWER TOOL INCLUDING CONDUCTION ANGLE CONTROL

RELATED APPLICATIONS

This application claims priority to, and the benefit of, U.S. Provisional Patent Application No. 63/179,824, filed Apr. 26, 2021, the contents of which are hereby incorporated by reference in their entirety.

FIELD

Embodiments described herein relate to systems and methods for performing field weakening techniques within a power tool using conduction angle control.

SUMMARY

Power tool applications may require high speeds at startup and/or the beginning of an application. However, the back emf generated within a brushless direct current ("DC") motor may reduce the initial speed available to the motor. Thus, it is desirable for a power tool to include processes and controls to provide field weakening of the back emf in order to increase and maintain operating speeds during operation of the power tool.

Methods described herein provide for controlling a conduction angle applied to a power tool motor. The method includes receiving by a motor controller, a desired speed signal, and monitoring a speed of the power tool motor. The method further includes a motor controller determining an error value between the desired speed signal and the monitored speed and determining a conduction angle signal based on the error value. The method also includes the motor controller determining whether the conduction angle signal is greater than the error value and increasing a conduction angle of the power tool motor in response to the conduction angle signal being determined to be greater than the error value.

In some embodiments, the motor controller is configured to decrease the conduction angle of the power tool motor in response to the conduction angle signal being determined to be less than the error value.

In some embodiments, the motor controller is configured to determine whether the conduction angle is less than a maximum threshold value and maintain the conduction angle in response to determining that the conduction angle is not less than the maximum threshold value.

In some embodiments, the maximum threshold value is 180°.

In some embodiments, the method also includes the motor controller determining whether the conduction angle is greater than a lower limit threshold in response to determining that the conduction angle signal is not greater than the speed error, decreasing the conduction angle in response to determining that the conduction angle is greater than the lower limit threshold, and maintaining the conduction angle in response to determining that the conduction angle is not greater than the lower limit threshold.

In some embodiments, the lower limit threshold is 140°.

In some embodiments, the conduction angle signal is a splined conduction angle signal.

In some embodiments, the splined conduction angle signal is determined using a piecewise polynomial function.

Power tools described herein include a motor, a power switching network configured to drive the motor and a motor controller in communication with the power switching network and including an electronic processor and a memory. The motor controller is configured to receive a desired speed signal, monitor a speed of the motor, and determine an error value between the desired speed signal and the monitored speed. The motor controller is further configured to determine a conduction angle signal based on the error value and determine whether the conduction angle signal is greater than the error value and increase a conduction angle output by the power switching network in response to the conduction angle signal being determined to be greater than the error value.

In some embodiments, the motor controller is further configured to decrease the conduction angle output by the power switching network in response to the conduction angle signal being determined to be less than the error value.

In some embodiments, the motor controller is further configured to determine whether the conduction angle is less than a maximum threshold value and maintain a conduction angle in response to determining that the conduction angle is not less than the maximum threshold value.

In some embodiments, the maximum threshold value is 180°.

In some embodiments, the motor controller is further configured to determine whether the conduction angle is greater than a lower limit threshold in response to determining that the conduction angle signal is not greater than the speed error, decrease the conduction angle in response to determining that the conduction angle is greater than the lower limit threshold, and maintain the conduction angle in response to determining that the conduction angle is not greater than the lower limit threshold.

In some embodiments, the lower limit threshold is 140°.

Power tools described herein include a motor, a power switching network configured to drive the motor and a motor controller in communication with the power switching network and including an electronic processor and a memory. The motor controller is configured to receive a desired speed signal, monitor a speed of the motor, and determine an error value between the desired speed signal and the monitored speed. The motor controller is further configured to determine a conduction angle signal based on the error value and determine whether the conduction angle signal is greater than the error value and increase a conduction angle output by the power switching network in response to the conduction angle signal being determined to be greater than the error value. The motor controller is further configured to decrease the conduction angle in response to the conduction angle signal being determined to be less than the error value. The motor controller further determines whether the conduction angle is less than a maximum threshold value and maintains the conduction angle in response to determining that the conduction angle is not less than the maximum threshold value.

In one aspect of the above embodiment, the maximum threshold value is 180°.

In another aspect, the motor controller is further configured to determine whether the conduction angle is greater than a lower limit threshold in response to determining that the conduction angle signal is not greater than the speed error, decrease the conduction angle in response to determining that the conduction angle is greater than the lower limit threshold, and maintain the conduction angle in response to determining that the conduction angle is not greater than the lower limit threshold.

In another aspect, the conduction angle signal is a splined conduction angle signal.

In another aspect, the splined conduction angle signal is determined using a piecewise polynomial function.

Before any embodiments are explained in detail, it is to be understood that the embodiments are not limited in their application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the disclosed embodiments. Furthermore, and as described in subsequent paragraphs, the specific configurations illustrated in the drawings are intended to exemplify embodiments and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

DETAILED DESCRIPTION

Figure 1:
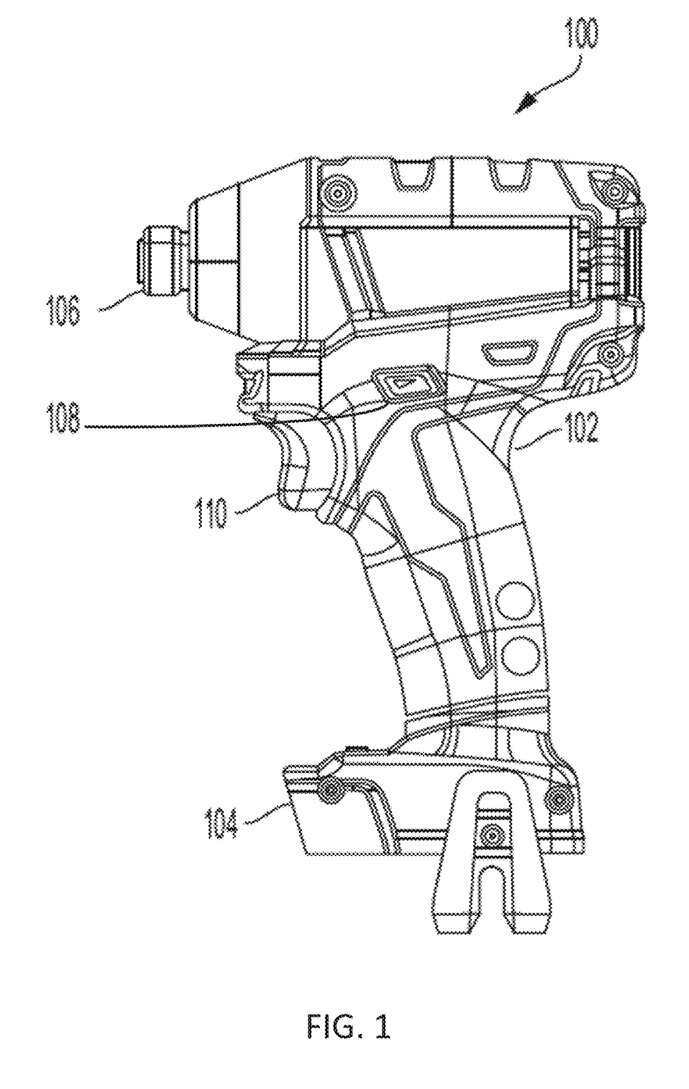
FIG. 1 is a side view of an exemplary power tool, according to some embodiments.

Turning to FIG. 1, an example power tool 100 is shown, according to one embodiment. The power tool includes a housing 102, a battery pack interface 104, a driver 106 (e.g., a chuck or bit holder), a forward-reverse selector 108, and a trigger 110. While FIG. 1 shows a specific power tool with a rotational output, the described motor control schemes may be used with multiple types of power tools, such as drills, drivers, drill-drivers, impact drivers, impulse drivers, or hammer drill-drivers, reciprocating saws, ratchets, powered torque wrenches, crimpers, cutters, grinders, or any other type of power tool that uses an electric motor that is controlled via a user input (e.g. a trigger). In some examples, the motor is a brushless DC motor.

In one embodiment, the trigger 110 is configured to be actuated by a user to perform an operation of the power tool 100. For example, actuation of the trigger 110 provides a signal to a controller of the power tool 100, which then performs an operation. Example operations may include rotation of the driver 106 or otherwise controlling a rotation and/or speed of a motor of the power tool 100. In some embodiments, the amount of actuation of the trigger 110 provides an output proportional to the amount of actuation to a controller. In one embodiment, the amount of actuation of the trigger 110 may correspond to a desired rotational speed of a motor of the power tool 100. In one embodiment, the forward-reverse selector 108 allows a user to control the direction of a rotating portion of the power tool 100, such as the driver 106.

Figure 2:
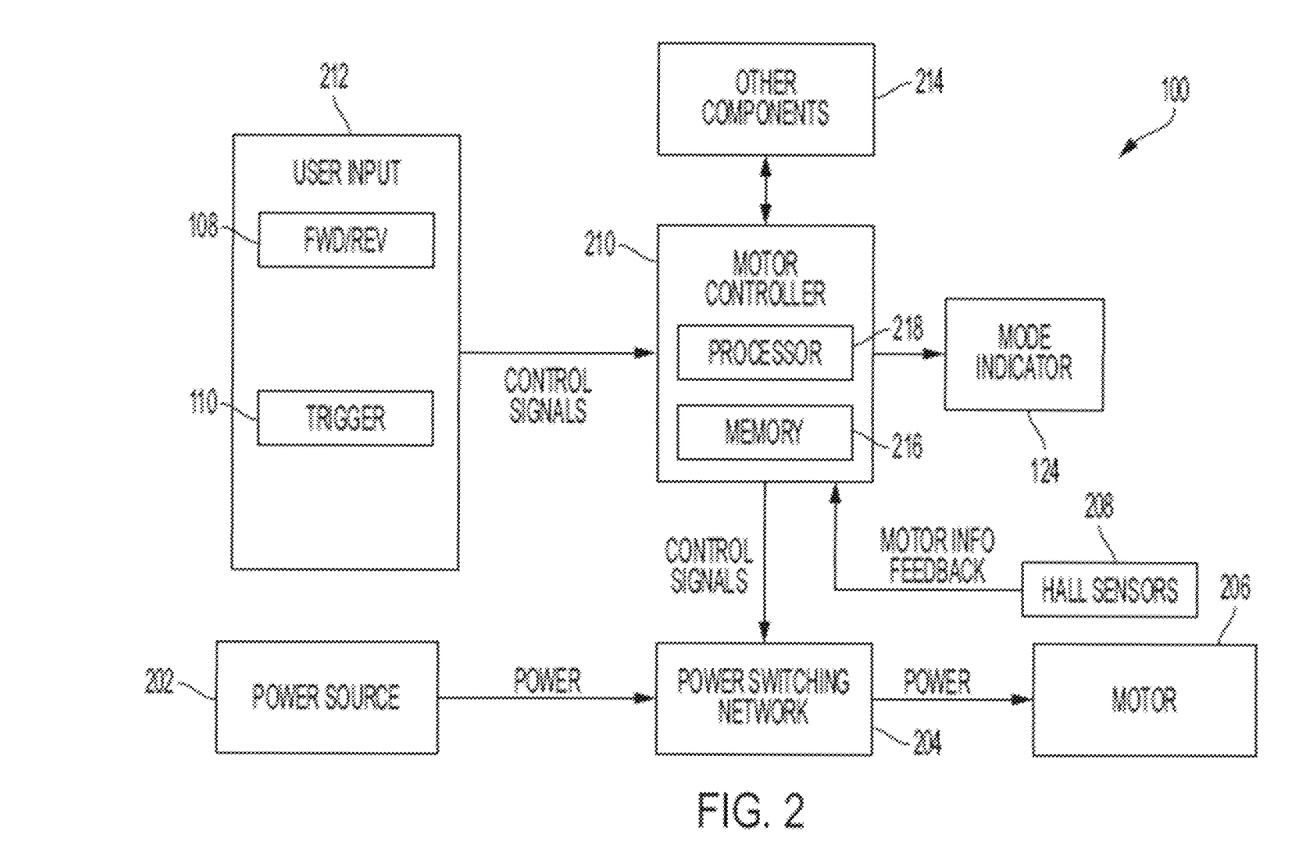
FIG. 2 is a block diagram of a brushless power tool, according to some embodiments.

Turning now to FIG. 2, a simplified block diagram of a brushless power tool, such as power tool 100 is shown, according to some embodiments. While the block diagram of FIG. 2 is described in relation to the power tool 100 described above, it is contemplated that the block diagram may be applicable to other power tools, such as those described herein. For purposes of brevity, the block diagram will be described in regard to power tool 100, unless otherwise indicated. The power tool 100 is shown to include a power source 202, a power switching network 204, a motor 206, Hall effect sensors 208, a motor controller 210, user inputs 212, and other components 214 (e.g., battery pack fuel gauge, work lights [LEDs], current/voltage sensors, etc.). The power source 202 provides DC power to the various components of the power tool 100 and may be a power tool battery pack that is rechargeable and uses, for instance, lithium ion cell technology. In some instances, the power source 202 may receive AC power (e.g., 120V/60 Hz) from a tool AC plug that is coupled to a standard wall outlet, and then filter, condition, and rectify the received power to output DC power. Each Hall sensor 408 outputs motor feedback information, such as an indication (e.g., a pulse) when a magnet of a rotor of the motor rotates across the face of that Hall effect sensor 208. Based on the motor feedback information from the Hall effect sensors 208, the motor controller 210 can determine the position, velocity, and acceleration of the rotor.

In some embodiments, the motor controller 210 includes a memory 216 for storing instructions and an electronic processor 218 coupled to the memory to retrieve and execute the instructions to thereby implement the functionality of the controller 210 described herein. The motor controller 210 is also configured to receive control signals from the user inputs 212, such as by actuation of the trigger 110. An output associated with the operation of the user inputs 212 may be provided to the motor controller 210, as described above. The outputs from the user inputs may be digital signals, analog signals, or a combination thereof.

In one embodiment, the motor controller 210 may be configured to operate the tool in different operational modes. For example, the motor controller 210 is configured to operate the tool in various fastener modes (e.g., self-tapping screw, deck screw, concrete screw, drywall screw, etc.), speed modes (e.g., high, medium, low), torque modes (high, medium, low), and the like. For each mode, one or more motor parameters for driving the motor are specified, such as: motor speed, motor maximum speed, motor minimum speed, motor torque, motor maximum torque, motor minimum speed torque, ramp up time or acceleration to get to desired speed, run time before motor shut off, number of impacts before motor shut off, number of impacts before speed up, number of impacts before motor slow down, maximum current before motor shut off, maximum current before motor slow down, and the like. As will be described in more detail below, the controller 210 may further be configured to control one or more of a conduction angle and/or a phase advance angle used to control the motor 206.

Figure 3:
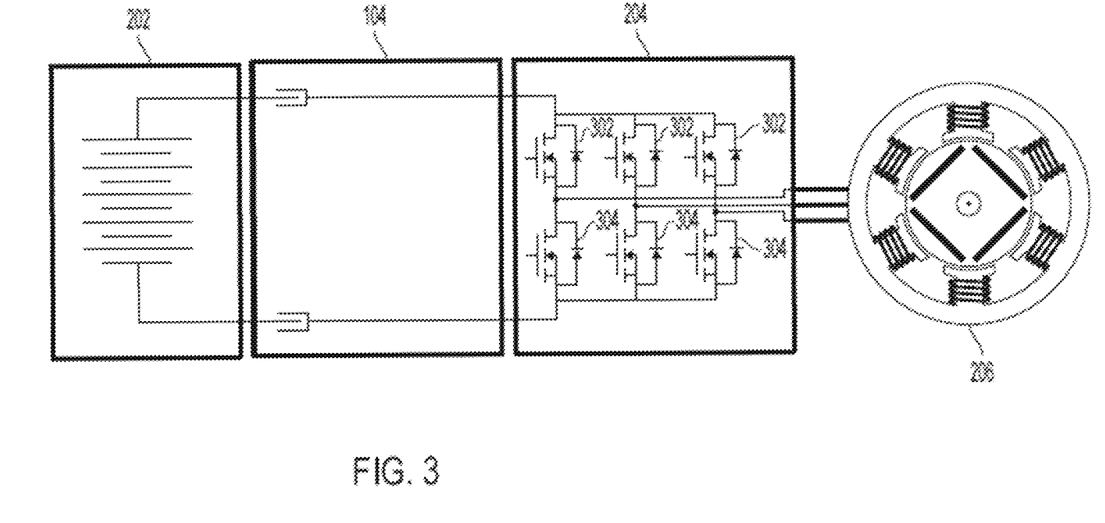
FIG. 3 is a circuit diagram of a power switching network, according to some embodiments.

In response to the control signals received via the user inputs 212, the motor controller 210 transmits control signals to the power switching network 204 to drive the motor 206, as explained in further detail with respect to FIG. 3. In some embodiments, the power tool 100 may be a sensorless power tool that does not include Hall effect sensors 208 or other position sensors to detect the position of a rotor of the motor 206. Rather, the rotor position may be detected based on the inductance of the motor 206 or the back electromotive force (emf) generated in the motor 206. Although, not shown, the motor controller 210 and other components of the power tool 100 are electrically coupled to the power source 202 such that the power source 202 provides power thereto.

FIG. 3 illustrates a circuit diagram of the power switching network 204. The power switching network 204 includes a number of high side power switching elements 302 (for example, field effect transistors ["FETs"]) and a number of low side power switching elements 304 (for example, FETs). The motor controller 210 provides the control signals to control the high side FETs 302 and the low side FETs 304 to drive the motor based on the motor feedback information and user controls, as noted above. For example, in response to detecting a pull of the trigger 110, and the input from forward-reverse selector 108, the motor controller 210 provides the control signals to selectively enable and disable the FETs 302 and 304 (e.g., sequentially, in pairs) resulting in power from the power source 202 to be selectively applied to stator coils of the motor 206 to cause rotation of a rotor. More particularly, to drive the motor 206, the motor controller 210 enables a first high side FET 302 and first low side FET 304 pair (e.g., by providing a voltage at a gate terminal of the FETs) for a first period of time. In response to determining that the rotor of the motor 206 has rotated based on a pulse from the Hall effect sensors 208, the motor controller 210 disables the first FET pair, and enables a second high side FET 302 and a second low side FET 304. In response to determining that the rotor of the motor 206 has rotated based on pulse(s) from the Hall effect sensors 208, the motor controller 210 disables the second FET pair, and enables a third high side FET 302 and a third low side FET 304. This sequence of cyclically enabling pairs of high side FET 302 and low side FET 304 repeats to drive the motor 206. Further, in some embodiments, the control signals include pulse width modulated (PWM) signals having a duty cycle that is set in proportion to the amount of trigger pull of the trigger 110, to thereby control the speed or torque of the motor 206.

As discussed above, the motor controller 210 may enact one or more field weakening processes or operations. Field weakening is generally used with a permanent magnet motor, such as a brushless DC ("BLDC") motor. As the permanent magnet motor rotates, a back emf is generated in one or more windings of the motor 206, which in turn makes driving current into the motor 206 more difficult, thereby resulting in a loss of speed or torque at the output of the motor 206. In one example, field weakening is achieved by advancing the conduction angle by a specific value, known as an advance angle. The advance angle may be applied based on a current speed of the motor 206. In some examples, the advance angle is only modified once a speed threshold has been exceeded. In some embodiments, an increase in advance angle causes a corresponding increase in an overall conduction angle applied to the motor 206. However, in some examples, the conduction angle may be shifted by an amount equal to the advance angle such that the overall conduction angle remains the same. Additionally, a freewheel angle may be modified in addition to, or in conjunction with, a change in conduction angle or advance angle. Freewheeling occurs when a motor winding is disconnected from an excitation voltage provided by one or more switches within the switching network 204 and a current stored within one or more windings of the motor flows through one or more switches within the switching network 204 (or through one or more freewheeling diodes within the switching network 204) to a supply rail opposite the supply rail that previously provided power to the armature during the previous conduction cycle.

Figure 4:
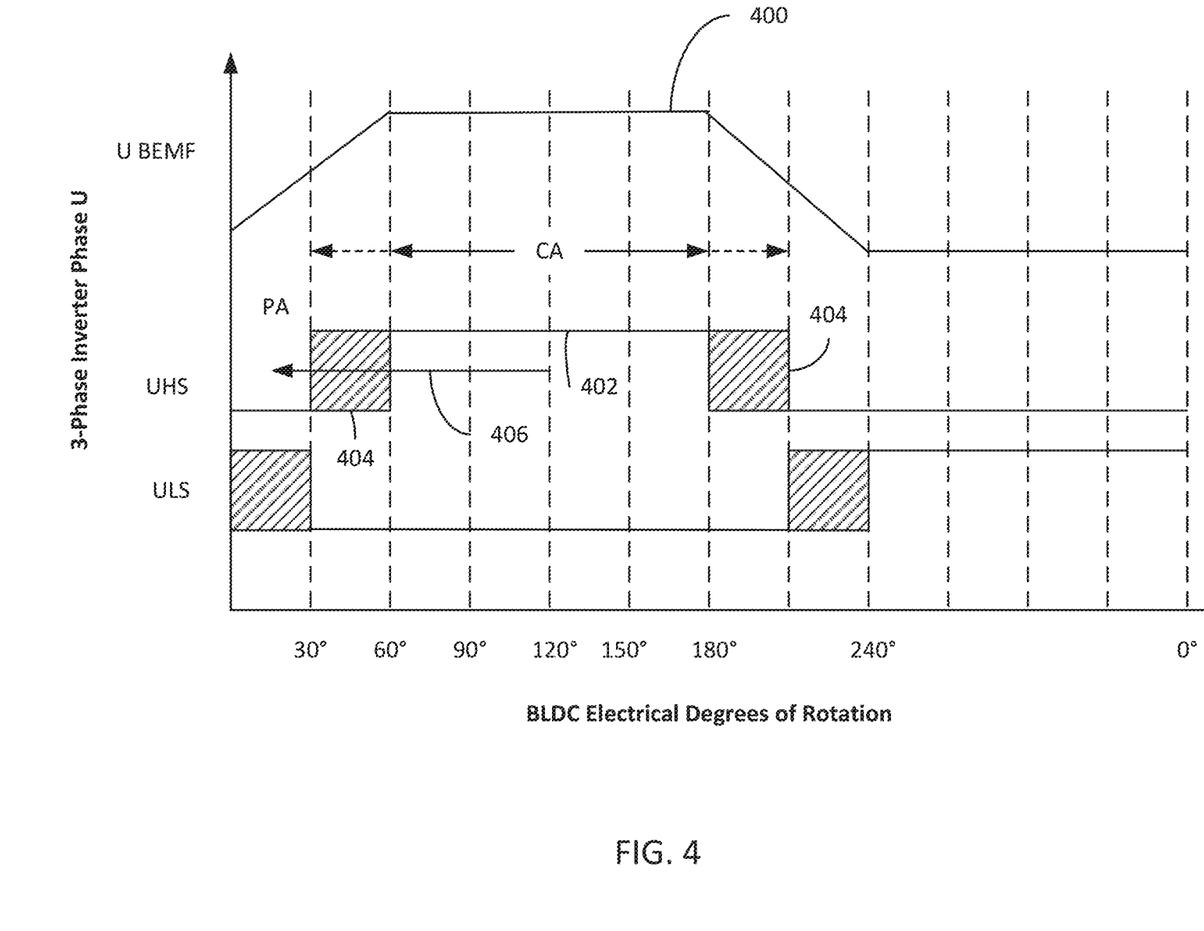
FIG. 4 is a graph showing commutation of a brushless motor, according to some embodiments.

In still further examples, the conduction angle may be varied to increase the conduction angle. Generally, a conduction angle applied to a BLDC motor is approximately 120°. However, in order to increase speed, such as via field weakening, the conduction angle for a given phase may be increased up to a maximum value, such as 180°. As shown in FIG. 4, an example of commutation applied to a BLDC motor is shown. The back emf ("BEMF") 400 generally tracks with the conduction angle 402. As shown in FIG. 4 the conduction angle may generally be 120° and applied to either a high side switch (such as high side FETs 302) or low side switches (such as low side FETs 304) as described above, in order to drive a motor, such as motor 206. As further shown in FIG. 4, the conduction angle 402 may be increased (as shown by optional conduction regions 404) from 120° to a maximum value, such as 180°. Further, as noted above, the conduction angle 402 may be shifted to occur earlier in the conduction cycle (phase advance), as shown by phase advance line 406.

Figure 5:
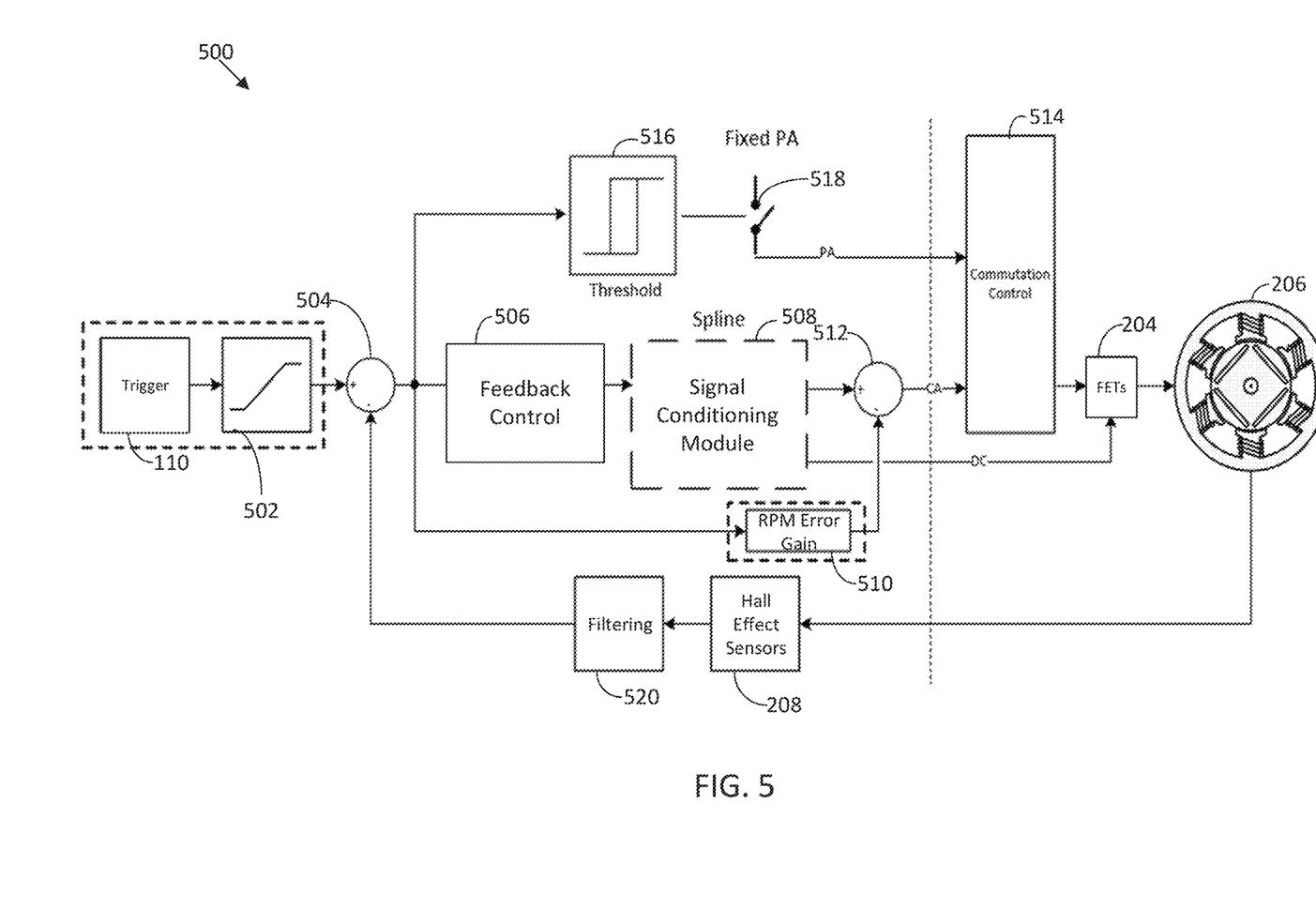
FIG. 5 is a block diagram of a control scheme for controlling the conduction angle of a power tool, according to some embodiments.

Turning now to FIG. 5, a control diagram 500 for performing field weakening in a power tool, such as power tool 100 described above, is shown according to some embodiments. While the components described with respect to control diagram 500 are also described with respect to the power tool 100 described above, it is understood that the described control scheme of control diagram 500 could be used with various power tools having a controller and one or more BLDC motors.

A trigger, such as trigger 110, generates an output 502 that corresponds to a desired speed of the power tool 100. In some embodiments, the output 502 may be a voltage output that increases linearly with an increase in the pull of the trigger 110 by a user. However, other output signals, such as stepwise or otherwise non-linear outputs are also contemplated as appropriate for a given application. The output 502 is then input into an error module 504 which is configured to determine a difference between the output 502 and the actual speed of the motor 206 and output an error signal based on the difference. The error signal output from the error module 504 is then fed into a feedback control block 506. In some embodiments, the feedback control block 506 is a proportional-integral ("PI") control block. However, other feedback control loop types, such as proportionalintegral-derivative ("PID"), proportional-derivative ("PD"), and other closed-loop control types as appropriate for a given application.

An output of the feedback control block 506 is provided to a signal conditioning module 508. In some embodiments, the signal conditioning module 508 uses one or more functions to convert the output signal (e.g., a conduction angle signal) of the feedback control block 506 into a desired signal. As shown in FIG. 5, the signal conditioning module 508 is configured to convert a linear output of the feedback control block 506 into a splined curve, such that initially the signal increases rapidly before reducing the rate of change to achieve the same maximum output as the linear output of the feedback control block. In some embodiments, the signal conditioning block uses one or more piecewise polynomial functions to generate the splined output. However, other functions are applicable. Further, while the signal conditioning module 508 is described above with generated a splined output, other output types, such as logarithmic, parabolic, etc. may be output from the signal conditioning module 508.

In other embodiments, the signal conditioning module 508 is configured to convert a non-linear output of the feedback control block 506 into a linear output. The signal conditioning module 508 may use one or more functions or algorithms to convert the non-linear output of the feedback control block 506 into a corresponding linear output.

Returning to error module 504, the output is further provided to an error gain module 510. The error gain module 510 may be configured to amplify the output of the error module 504. The output of the error gain module 510 is then output to a conduction angle error module 512, along with an output of the signal conditioning module 508. The output of the conduction angle error module 512 is then output to a commutation control module 514. The commutation control module 514 is configured to control the commutation angle applied to the motor 206 via the power switching network 204. For example, the commutation control module 514 may control the conduction angle to vary between 120° and 180° in some embodiments. A drive signal is also provided to the power switching network 304 via the signal conditioning module 508 to drive the one or more switches within the power switching network 304 in conjunction with the output from the commutation control module 514. As will be described in more detail below, as the output from the error gain module 510 increases over time due to current saturation, the output of the conduction angle error module 512 will decrease to reduce the commutation angle controlled by the commutation control module 514. In some embodiments, the commutation control module 514 includes a limiter function to limit how much the commutation angle is reduced as the output of the error gain module 510 increases. In some examples, the output of the commutation control module 514 is configured to limit the reduction of the conduction angle to 140°. However, limit values of between 120° and 140° or between 140° and 180° are also contemplated.

The output of the error module 504 is further provided to a comparator module 516, which is configured to determine if the error value output from the error module 504 exceeds a predetermined threshold. The output of the comparator module 516 controls an electronic switch 518. The output of the electronic switch 518 provides an indication to the commutation control module 514 indicating if the phase advance angle should be changed. For example, where the input to the comparator module 516 exceeds the predetermined threshold value, the comparator module 516 closes the switch 518, indicating that the phase advance angle should be varied. In some embodiments, the phase advance angle is adjusted by a fixed value, such as 20°. However, values of more than 20° or less than 20° are also contemplated. In other examples, the phase advance angle may be adjusted within a range based on one or more parameters, such as speed error, motor speed, motor current, conduction angle, etc.

As described above, the speed of the motor 206 may be determined via one or more speed sensors, such as Hall effect sensors 208. The output of the Hall effect sensors 208 is filtered at filtering block 520 to provide the speed input to the error module 504.

While the above control diagram 500 recites specific discrete functions and modules, it is contemplated that one or more of the functions and/or modules of the control diagram 500 may be performed within a controller, such as motor controller 210. For example, one or more of the error module 504, the feedback control block 506, the signal conditioning module 508, the error gain module 510, the conduction angle error module 512, the commutation control module 514, the comparator module 516, the switch 518, and the filtering block 520 may be performed or executed by the motor controller 210.

Figure 6:
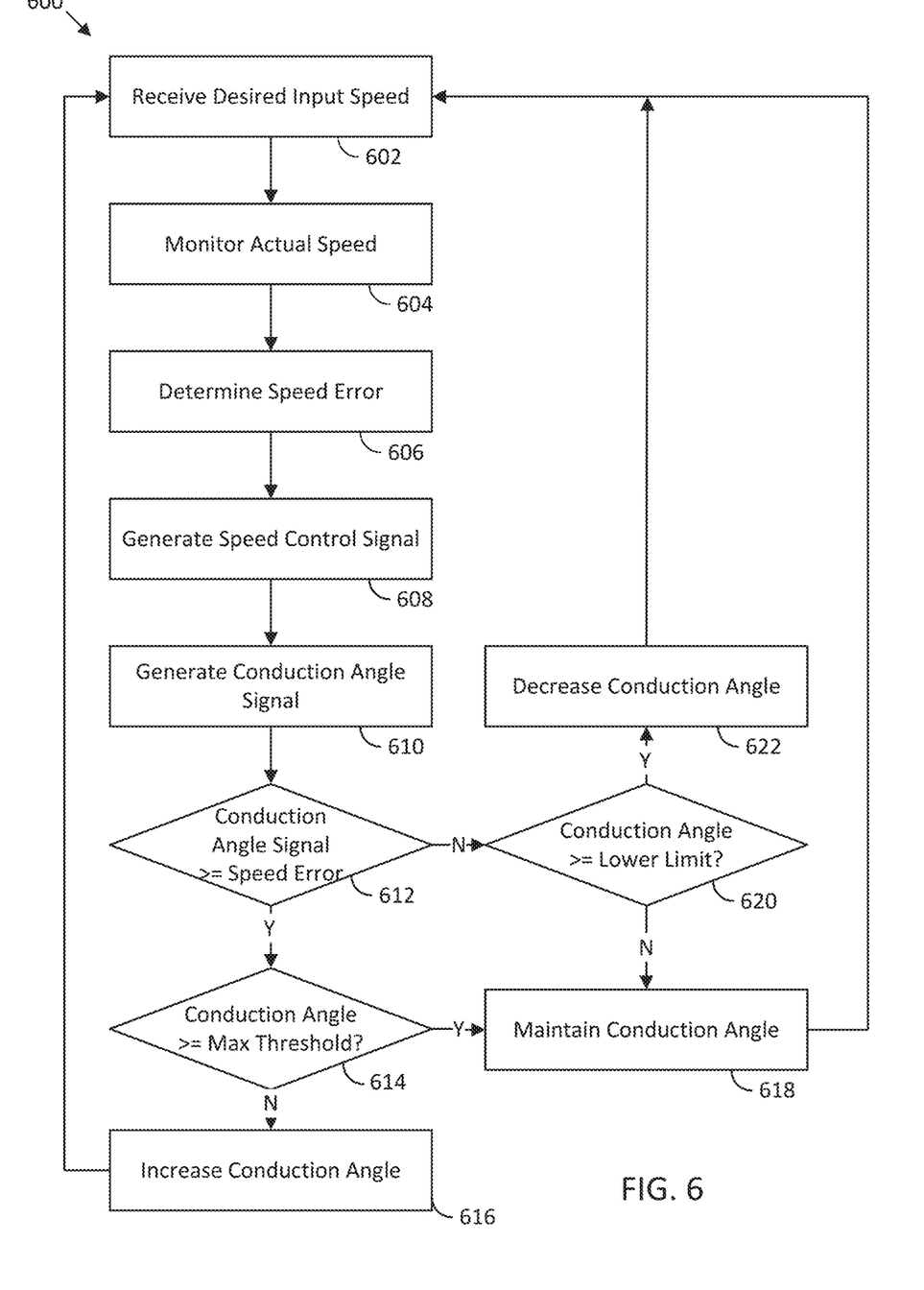
FIG. 6 is a flow chart illustrating a process for controlling the conduction angle of a power tool, according to some embodiments.

Turning now to FIG. 6, a conduction angle control process 600 for controlling the conduction angle of a power tool motor, such as motor 206 is shown, according to some embodiments. The process 600 is described with respect to the power tool 100 and the control diagram 500. However, the process 600 may be performed with multiple power tools and/or controllers, as appropriate for a given application. At process block 602, a desired input speed value is received at the motor controller 210. As described above, the desired input speed may be provided via one or more user inputs 212, such as trigger 110. At process block 604, an actual speed of the motor 206 is monitored. In some embodiments, the actual speed of the motor 206 may be monitored via one or more Hall effect sensors 208. In some embodiments, the monitored speed may be filtered, as described above.

At process block 606, the motor controller 210 determines a speed error (e.g. difference) between the monitored actual speed and the desired speed input value. At process block 608 a speed control signal is generated. In one embodiment, the speed control signal may be generated based on the speed error value. For example, the motor controller 210 may use feedback control, such as described above, to generate the speed control signal. At process block 610, a conduction angle signal is generated. In some embodiments, the conduction angle signal is generated by the motor controller 210. For example, the motor controller may use one or more signal conditioning modules, such as described above, to generate the conduction angle signal. As described above, the signal conditioning module may generate a splined conduction angle signal. In other examples, the conduction angle signal may be a linear conduction angle signal. The conduction angle signal may be generated using a piecewise polynomial function, such as described above. The conduction angle signal may be generated based on the speed error value.

At process block 612, the motor controller 210 determines whether a value of the conduction angle signal is greater than a value of the speed error. In some embodiments, the speed error signal may be amplified as described above. In response to determining that the conduction angle signal is greater than the speed error, the motor controller 210 determines whether a present-state conduction angle is greater than a maximum threshold at process block 614. In one embodiment, the maximum threshold is 180°. However, values of more than 180° or less than 180° are also contemplated. In response to determining that the present-state conduction angle is not greater than the maximum threshold, the conduction angle is increased at process block 616. In some embodiments, the conduction angle is increased based on the generated conduction angle signal. After increasing the conduction angle, the motor controller 210 returns to process block 602. In one embodiment, the conduction angle is increased or decreased by controlling switching of a power switching network, such as power switching network 204, described above.

In response to the motor controller 210 determining that the conduction angle is greater than the maximum threshold, the present-state conduction angle is maintained at process block 618. The motor controller 210 then continues to receive a desired input speed at process block 602. Returning to process block 612, in response to the motor controller 210 determining that the conduction angle signal is not greater than the speed error, the motor controller 210 then determines whether the present-state conduction angle is greater than a lower limit. In some embodiments, the lower limit is 140°. However, values of more than 140° or less than 140° are also contemplated. In response to determining that the present-state conduction angle is not greater than the lower limit, the motor controller 210 maintains the conduction angle at the present value at process block 618. In response to determining that the present-state conduction angle is greater than the lower limit at process block 620, the motor controller 210 decreases the conduction angle at process block 622. In some embodiments, the conduction angle is decreased based on a ratio of the speed error to the conduction angle signal. In other embodiments, the conduction angle is decreased by an amount equal to the conduction angle less the speed error. The motor controller then continues to receive the desired input speed at process block 602 to continually control the output of the power tool.

Figure 7:
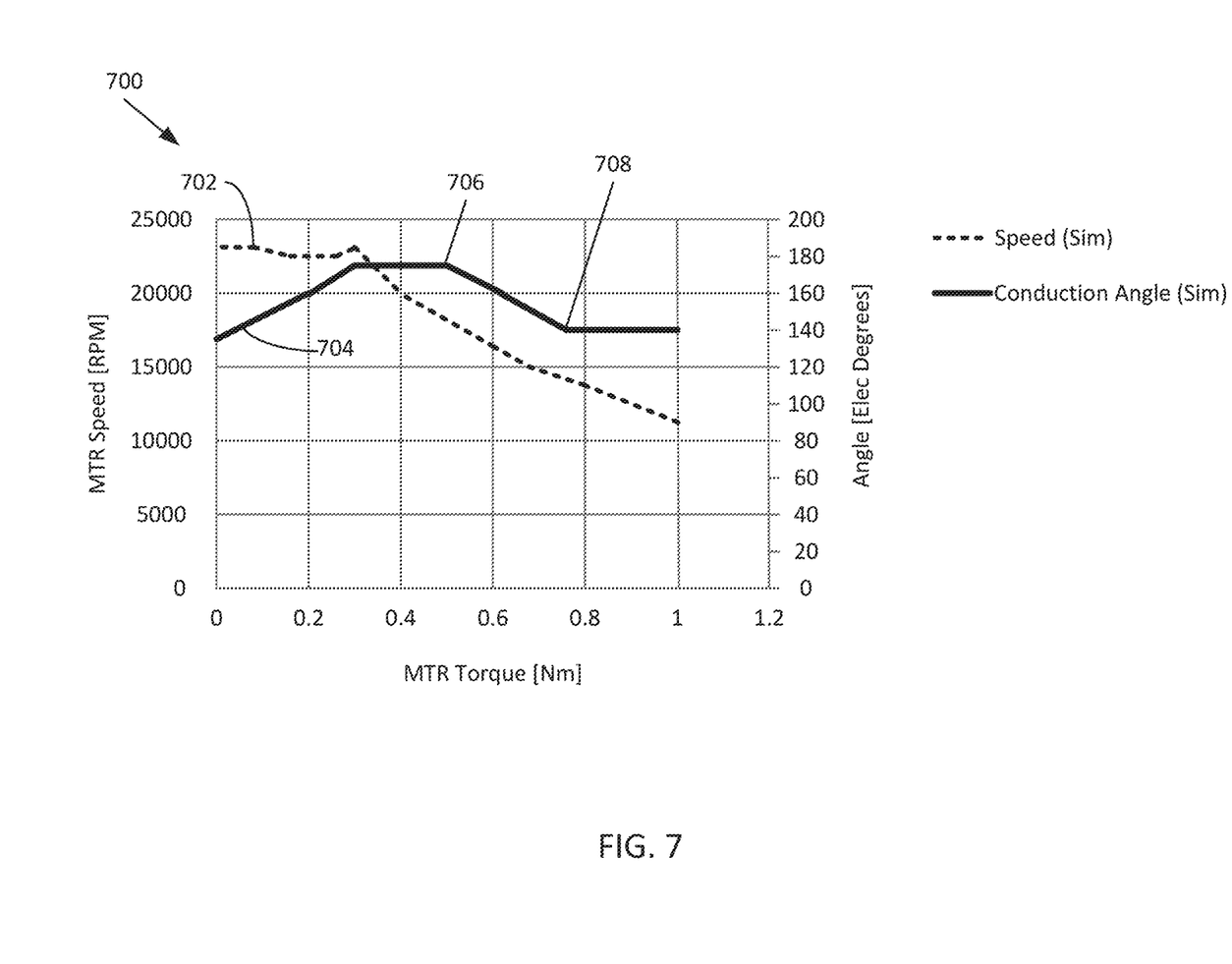
FIG. 7 is a graph showing the speed of a brushless motor using conduction angle control, according to some embodiment.

Turning now to FIG. 7, a data plot 700 showing speed 702 and conduction angle 704 across a range of torque values is shown, according to some embodiments. The data shown in FIG. 7 illustrates a power tool, such as power tool 100, using the conduction angle control process 600, described above. As shown in FIG. 7, to maintain the speed 702 at a relatively constant value, the conduction angle 704 increases in a generally linearly manner up to maximum conduction angle (shown as 180°). While the conduction angle 704 is shown increasing in a linear manner, it is understood that the conduction angle 704 may be increased using other rates, including curves such as splines, logarithmic, second order polynomial, etc. As the speed 702 begins to decrease due to saturation of the current applied to the motor 206, the conduction angle 704 maintains a constant value (e.g. max value) until the speed error becomes too great at point 706, at which point the conduction angle 704 decreases until reaching a minimum limit at point 708.

Figure 8:
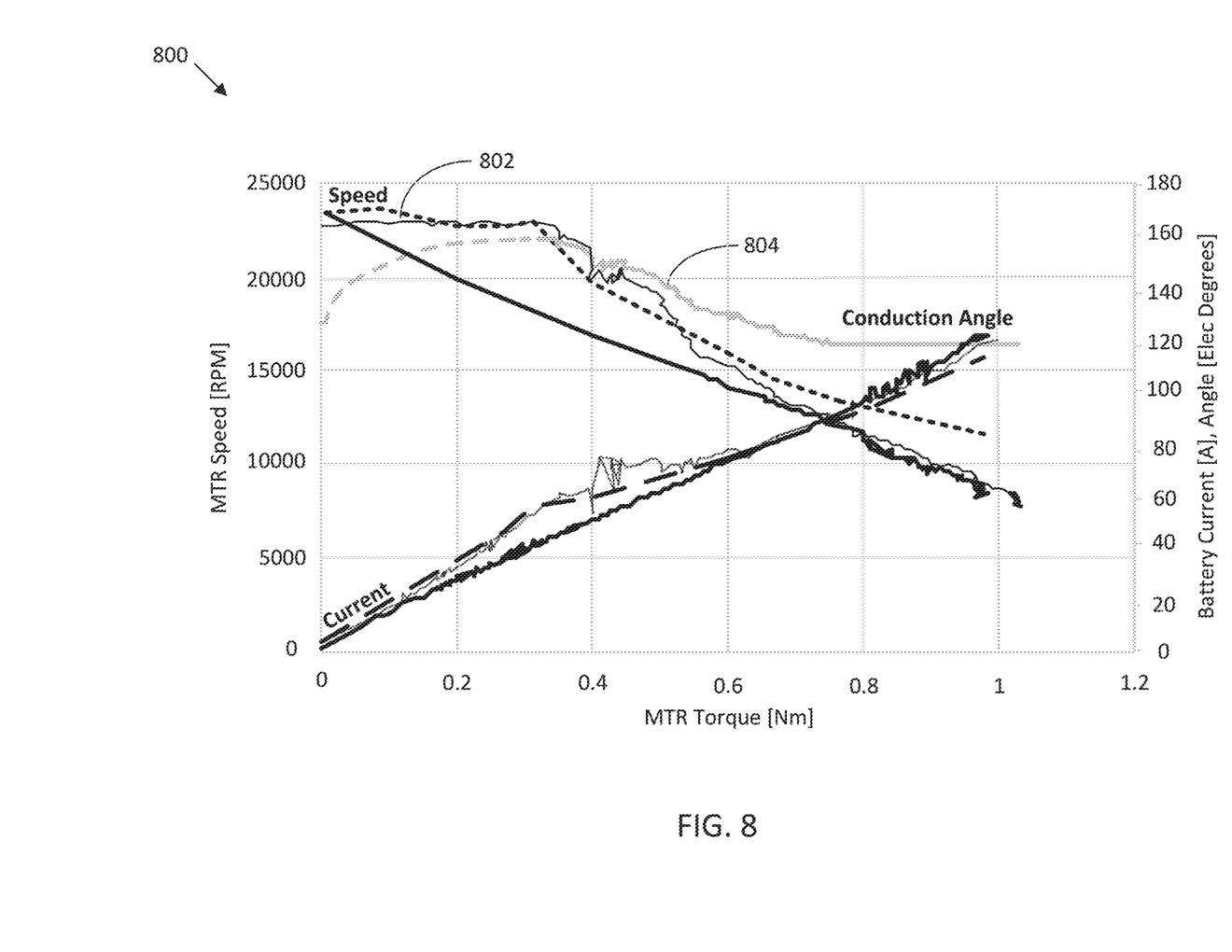
FIG. 8 is a graph showing the speed and current of a brushless motor using conduction angle control, according to some embodiment.

FIG. 8, shows an additional data plot 800 illustrating a speed output 802 and a conduction angle output 804 of a motor, such as a power tool motor, wherein the conduction angle output 804 is increased using a non-linear curve, such as a spline as described above.

Various features and advantages are set forth in the following claims.

What is claimed is:

1. A power tool, comprising:
a motor;
a power switching network configured to drive the motor; and
a motor controller in communication with the power switching network and including an electronic processor and a memory, and the motor controller configured to:
receive a desired speed signal,
monitor a speed of the motor,
generate an error value signal between the desired speed signal and the monitored speed, wherein the error value signal is a linear signal,
determine a conduction angle signal based on the error value signal using a piecewise polynomial function, wherein the conduction angle signal is a non-linear signal,
determine whether the conduction angle signal is greater than the error value, and
increase a conduction angle output by the power switching network in response to the conduction angle signal being determined to be greater than the error value.

2. The power tool of claim 1, wherein the motor controller is further configured to decrease the conduction angle output by the power switching network in response to the conduction angle signal being determined to be less than the error value signal.

3. The power tool of claim 1, wherein the motor controller is further configured to:
determine whether the conduction angle is less than a maximum threshold value; and
maintain the conduction angle in response to determining that the conduction angle is not less than the maximum threshold value.

4. The power tool of claim 3, wherein the maximum threshold value is 180°.

5. The power tool of claim 1, wherein the motor controller is further configured to:
determine whether the conduction angle is greater than a lower limit threshold in response to determining that the conduction angle signal is not greater than the error signal,
decrease the conduction angle in response to determining that the conduction angle is greater than the lower limit threshold, and
maintain the conduction angle in response to determining that the conduction angle is not greater than the lower limit threshold.

6. The power tool of claim 5, wherein the lower limit threshold is 140°.

7. The power tool of claim 1, wherein the conduction angle signal is a splined conduction angle signal.

8. A power tool, comprising:
a motor;
a power switching network configured to drive the motor; and
a motor controller in communication with the power switching network and including an electronic processor and a memory, and the motor controller configured to:
receive a desired speed signal,
monitor a speed of the motor,
generate an error value signal between the desired speed signal and the monitored speed,
generate a conduction angle signal based on the generated error value signal, wherein the conduction angle signal is a splined conduction angle signal,
determine whether the conduction angle signal is greater than the error value signal, increase a conduction angle output by the power switching network in response to the conduction angle signal being determined to be greater than the error value signal, decrease the conduction angle output by the power switching network in response to the conduction angle signal being determined to be less than the error value signal, determine whether the conduction angle is less than a maximum threshold value, and maintain the conduction angle in response to determining that the conduction angle is not less than the maximum threshold value.

9. The power tool of claim 8, wherein the maximum threshold value is 180°.

10. The power tool of claim 8, wherein the motor controller is further configured to:

determine whether the conduction angle is greater than a lower limit threshold in response to determining that the conduction angle signal is not greater than the error value signal, decrease the conduction angle in response to determining that the conduction angle is greater than the lower limit threshold, and maintain the conduction angle in response to determining that the conduction angle is not greater than the lower limit threshold.

11. The power tool of claim 8, wherein the splined conduction angle signal is determined using a piecewise polynomial function.

12. A power tool, comprising:

a motor;

a power switching network configured to drive the motor; and a motor controller in communication with the power switching network and including an electronic processor and a memory, and the motor controller configured to:

receive a desired speed signal, monitor a speed of the motor, generate an error value signal between the desired speed signal and the monitored speed, wherein the error value signal is a linear signal, determine a conduction angle signal based on the error value signal, wherein the conduction angle signal is a splined conduction angle signal, determine whether the conduction angle signal is greater than the error value, and increase a conduction angle output by the power switching network in response to the conduction angle signal being determined to be greater than the error value.

13. The power tool of claim 12, wherein the motor controller is further configured to decrease the conduction angle output by the power switching network in response to the conduction angle signal being determined to be less than the error value signal.

14. The power tool of claim 12, wherein the motor controller is further configured to:

determine whether the conduction angle is less than a maximum threshold value; and maintain the conduction angle in response to determining that the conduction angle is not less than the maximum threshold value.

15. The power tool of claim 14, wherein the maximum threshold value is 180°.

16. The power tool of claim 12, wherein the motor controller is further configured to:

determine whether the conduction angle is greater than a lower limit threshold in response to determining that the conduction angle signal is not greater than the error signal, decrease the conduction angle in response to determining that the conduction angle is greater than the lower limit threshold, and maintain the conduction angle in response to determining that the conduction angle is not greater than the lower limit threshold.

17. The power tool of claim 16, wherein the lower limit threshold is 140°.

* * * * *